United States Patent [19]
Thompson

[11] 3,751,104
[45] Aug. 7, 1973

[54] MOVEMENT CONTROL FOR PICKUP-MOUNTED VEHICLE

[76] Inventor: Quenten E. Thompson, 842 N. Cummings Rd., Covina, Calif. 91722

[22] Filed: July 7, 1971

[21] Appl. No.: 160,412

[52] U.S. Cl. ............................ 296/23 MC, 188/317
[51] Int. Cl. ................................................ B60p 3/32
[58] Field of Search .................... 296/23 R, 23 MC; 188/282, 317

[56] References Cited
UNITED STATES PATENTS

| | | | |
|---|---|---|---|
| 3,402,961 | 9/1968 | Larson | 296/23 MC |
| 2,060,590 | 11/1936 | Padgett | 188/317 |
| 3,389,766 | 6/1968 | Henry-Biabaud | 188/317 |

Primary Examiner—Philip Goodman
Attorney—Beehler, Bruce A. Jagger et al.

[57] ABSTRACT

Hydraulic members connect two relatively movable parts exemplified by a pickup bed and a camper mounted thereon, said members being extensible and contractable in response to movement of the parts. A cylinder connected to one part cooperates with a piston axially movable in the cylinder and connected to the other part. Oppositely biased poppets are carried by the piston. One poppet, during piston movement in one direction, bypasses hydraulic fluid from one end of the cylinder to the other end, and the other poppet, during movement in the opposite direction, bypasses hydraulic fluid from said other end to the first mentioned end of the cylinder. Bias-regulating springs for each poppet are capable of being adjusted to regulate the bypass flow.

5 Claims, 5 Drawing Figures

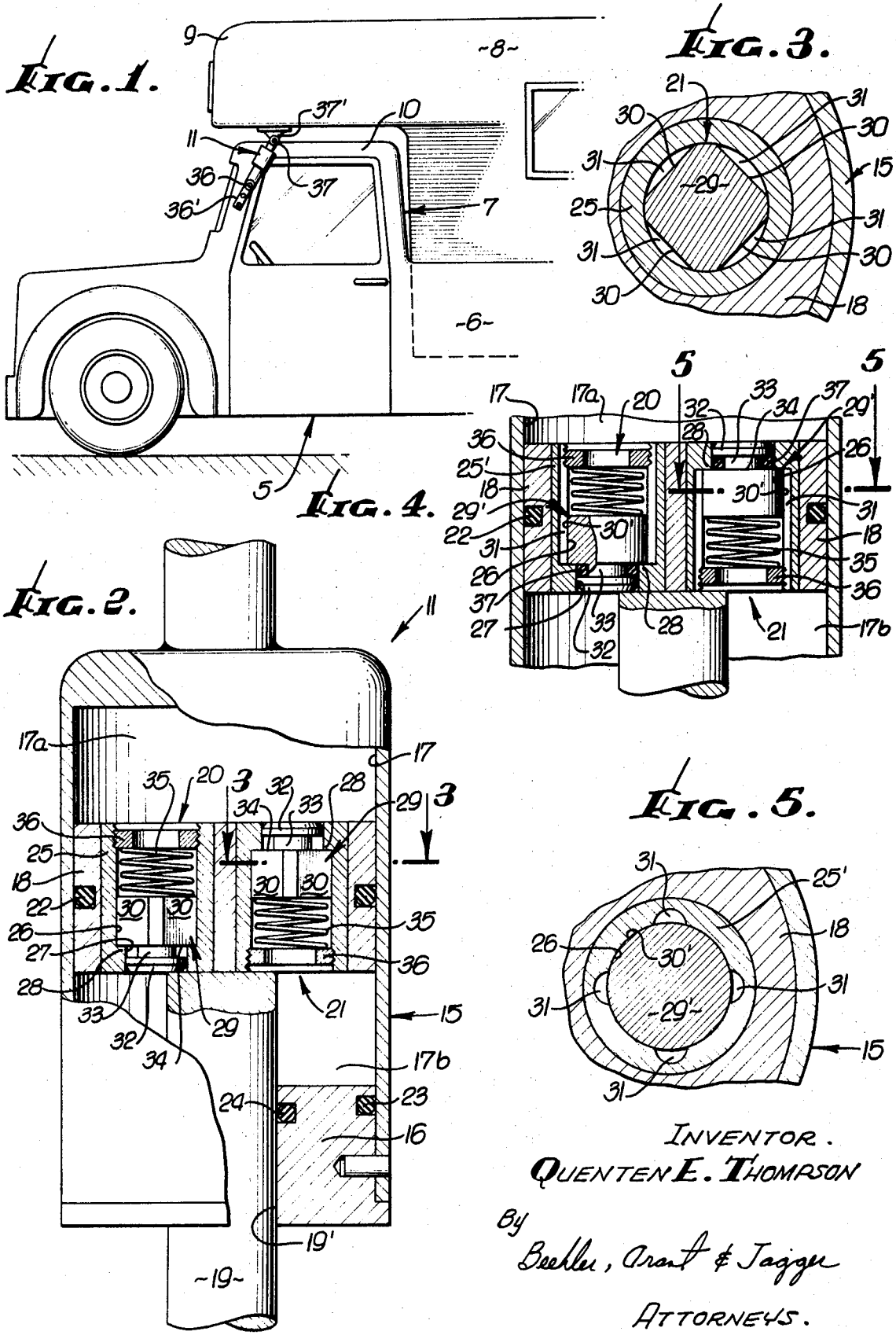

MOVEMENT CONTROL FOR PICKUP-MOUNTED VEHICLE

Separate structures mounted on automotive vehicles, especially those that are demountable so the vehicle may be used alone, when rigidly connected in place, are subject to road shocks. Campers so mounted are especially vulnerable to such shocks.

The movement that causes much of the problem of mounting a camper on a truck is movement of the frame as it flexes between the camper and the cab of the truck. This flexing is motivated by roads that have a type of rhythmic producing motion built into them, due to their construction, such as concrete road-ways with the division in them, wash board roads, uneven asphalt roads, etc.

The truck frame flexing produces the jarring effect encountered by large trucks and trailers on the roadway.

To eliminate this problem, the camper could be locked solidly overhead to the truck frame as with a solid bar. Such a solid type of arrangement would stop the flexing and jarring but would cause damage to the camper and truck. Neither trucks or campers are constructed or designed to withstand such a strain and force. Another problem met when using a solid bar is to make the ride unbearably rough because of the spring being firmer than usual. To overcome the undesirable circumstances related above, the invention contemplates a unit built to hold solid until a preset pressure is attained and then capable of movement to prevent damage to the truck and camper.

The unit should be one designed to stop the camper and truck from moving in separate directions arranged to hold to a preset pressure, after which it will yield to prevent damage once having reached the preset pressure.

Attention is directed to related prior art patents, namely:

Bowen, U.S. Pat. No. 3,347,590; Allinquant, U.S. Pat. No. 2,809,825; Schultze, U.S. Pat. No. 3,190,400 Montgomery et al., U.S. Pat. No. 2,888,947 La Vigne, Jr. et al., U.S. Pat. No. 3,443,572.

Customarily campers, even when not fully equipped, are relatively heavy and need to be fastened to the pickup vehicle with rugged dependable fastenings capable of maintaining a firm connection during travel over rough terrain. Naturally shocks encountered are passed to the camper and its contents, and the effect of the shock and resulting damage is likely to be appreciably amplified.

It is therefore among the objects of the invention to provide a new and improved set of connections for a device such as a camper to its mobile carriage which are capable of effectively damping the transmission of road shocks from the carriage to the camper.

Another object of the invention is to provide a new and improved set of connections for securing a camper to an automotive chassis, the damping effect of which is smooth, firm and dependable and devoid of unwanted springiness and bounce.

Still another object of the invention is to provide a new and improved set of connections for securing a camper to a mobile chassis which are so oriented and attached that they retain maximum effectiveness as movement is generated between the camper and the mobile chassis during travel of the combination over varied road conditions and terrain, and when subject to varied braking conditions.

Also included among the objects of the invention is to provide such connecting means as are positive in operation, convenient in use, easily installed in a working position and easily disconnected therefrom, economical of manufacture, relatively simple, and of general superiority and serviceability.

With these and other objects in view, the invention consists in the arrangement and combination of the various parts of the device, whereby the objects contemplated are attained, as hereinafter set forth, pointed out in the claims, and illustrated in the accompanying drawings.

FIG. 1 is a side elevational view of a pickup truck mounting an over-cab camper equipped with a set of movement connections which attach the camper to the cab.

FIG. 2 is an enlarged longitudinal sectional view of one of the connection units.

FIG. 3 is a fragmentary enlarged cross-sectional view taken on the line 3—3 of FIG. 2.

FIG. 4 is a fragmentary longitudinal sectional view of a second form of the invention.

FIG. 5 is a fragmentary cross-sectional view on the line 5—5 of FIG. 4.

In an embodiment of the invention chosen for the purpose of illustration there is shown a conventional pickup truck 5 which, for the purpose of this invention, is provided with a bed 6 and a cab 7. In other respects, this vehicle may be generally conventional. Also shown is a structure commonly referred to as a camper 8 mounted on the bed 6, the camper being provided with a forward extension 9 which, following common practice, is spaced in a clear position above a cab roof 10. Whether permanently or removably mounted, the camper 8 is secured only to the bed 6, and is subject to those movements of the bed encountered during travel over the road or elsewhere.

According to the invention, two movement-limiting devices 11 are used as connections, one being located on each side of the vehicle. These interconnect the extension 9 of the camper 8 to the cab roof 10 for the purpose of damping the lift and drop movements of said extension and keeping the same from making contact with said cab roof.

It is significant that the longitudinal axis of the movement-limiting device extends rearward from the front of the cab at an angle of about 30° from vertical. There is provided a pivotal connection 36 between a bracket 36' on the cab roof and the lower end of the device 11, and a second pivotal connection 37 between a bracket 37' on the extension 9 of the camper and the upper end of the device 11. The pivot axes of the pivot connections 36 and 37 are made substantially perpendicular to the fore and aft center line of the pickup truck 5 which serves as a mobile chassis. In this way movement of the camper transverse with respect to the bed 6 is restricted while movement fore and aft is permitted, subject to the limiting effect of the device 11.

More particularly the device 11 comprises a cylinder 15 provided with an end cap 16 to enclose a chamber 17 in the cylinder. A piston 18 is operable in the cylinder and a stem 19 extends from the piston and through an opening 19' in the cap 16. A first normally closed poppet valve 20 carried by the piston passes hydraulic fluid from one end 17b of the chamber on one side of the piston 18 to the opposite end 17a of said chamber on the other side of the piston, when there is longitudinal movement of the piston downward relative to the cylinder, as viewed in FIG. 2. A second normally closed poppet valve 21 carried by the piston passes hydraulic fluid from the chamber end 17a to the chamber end 17b when there is longitudinal movement of the piston in the opposite direction relative to the cylinder.

An O-ring 22 seals between the inside of the cylinder 15 and the periphery of the piston 18 to prevent flow between the chamber ends 17a and 17b around the piston. An O-ring 23 seals between the cylinder 15 and the cap 16, and an O-ring 24 seals between the cap and the stem 19.

As can be seen from FIG. 2, the poppet valves 20 and 21 are alike except that one is inverted relative to the other. Each said poppet valve is shown as comprising a sleeve-like body 25 that extends through the piston 18, each body having a bore or passage 26 with a reduced passage portion 27, which in the valve 20 opens to chamber end 17b, and in the valve 21 opens to chamber end 17a. A seat or shoulder 28 is formed between each bore 26 and the smaller portion 27 thereof.

A poppet 29 is slidingly fitted in each bore 26, the same being provided with flat sides 30 or similar surfaces that cooperate with the bore into which the poppet is fitted to form bypass passages. Each poppet 29 is provided with a reduced end 32 which has a sliding fit in the reduced bore portion 27. An annular recess 33 is provided at the base of the reduced portion 32 adjacent a shoulder 34. When the shoulder 34 of the poppet is resiliently biased against the seat 28 by a spring 35, the reduced end 32 prevents unrestricted flow of hydraulic fluid past the reduced bore portion 27 and thus through the piston 18. A tension-adjusting ring nut 36 has threaded engagement with each body 25 for adjustment of the movement-yielding tension of said spring.

In the form of device illustrated in FIG. 4 poppets 29' each have an essentially cylindrical portion 30' providing a smooth sliding fit in the bore 26. In order that hydraulic fluid may pass through the bore 26, a series of bypass passages 31 are formed in the wall of the bore 26. To seal the poppet against premature operation, an O-ring or similar annular sliding seat 37 may be provided in the annular recess 33. A sleeve like body 25' is similar to the body 25.

OPERATION

After assembly of the devices 11, the springs 35 are tensioned as desired, according to the weight of the camper, to hold the piston 18 in an intermediate position, as shown, the adjustment being one taking into consideration the forces which may generate under various road shocks or other sudden movements, the effect of which may be to cause the camper 8 to move up and down from the adjusted position relative to the vehicle 5. The chamber 17 is filled with hydraulic fluid, the cap 16 is secured in place and the devices are assembled on the vehicle as shown and described.

It will be clear that whenever the camper reacts in a manner to move downwardly from the tension-adjusted position, the poppet 29 in the valve 21 is displaced from its seat or shoulder 28, against the bias of the spring 35, by the fluid in the chamber end 17a acting on the reduced portion 32. After the reduced portion moves to a position clear of the reduced bore portion 27, the reduced bore portion is open so that fluid under pressure flows into the bore 26 and past the flat sides 30 acting as bypass passages, causing the chamber end 17b, as it increases in size to fill with the liquid thus displaced from the chamber end 17a. The poppet 29 of the valve 20 remains in its flow-stopping position, since the fluid pressure on the top thereof is greater than the upward pressure of the fluid filling the chamber end 17b. The damping achieved by this displacement of hydraulic fluid absorbs the shock of such movement in a degree according to the bypass size of the passages. Minor shocks are insufficient to move the reduced portion 32 far enough to clear the reduced bore portion 27 and this action minimizes a spring-like effect which may be described as too sensitive.

Upon reverse or upward movement of the cylinder 15 relative to the piston 18, a similar but reverse displacement from the chamber end 17b to the end 17a, through the poppet valve 20, occurs and with a similar damping effect.

It will be understood that the devices 11 may be used, as above suggested, to dampen the forces generated between two bodies of any sort.

In operation of the device of FIG. 4 the fit of the reduced end 32 may be less critical in that the O-ring seal 37 prevents passage of the hydraulic fluid for minor shocks. Once the O-ring seal 37 is clear, hydraulic fluid then passing through the reduced passage portion 27 passes through the bypass passages 31 to find its way to the opposite chamber end 17b.

The construction heretofore disclosed is subject to modification without departing from the spirit and scope of the invention. Therefore, it is not desired to restrict the invention to the particular form of construction illustrated and described, but to cover all modifications that may fall within the scope of the appended claims.

Having described the invention, what is claimed as new in support of Letters Patent is:

1. A movement limiting device to dampen forces generated by two members movable relatively toward and from each other, one said member comprising the cab of a wheel-mounted vehicle having a bed located rearwardly of said cab, and the other said member comprising a forwardly directed extension of a camper mounted on said bed, said extension being above and spaced from said cab, said device comprising:

a. a pivotal connection provided on a side of the cab member,
 b. a second pivotal connection provided on the extension member of the camper and in generally longitudinal alignment with the first mentioned pivotal connection, both said pivotal connections having axes substantially perpendicular to the fore and aft center line of said vehicle,
 c. a cylinder defining a chamber closed at one end and having an opening in the other, said cylinder being directly connected at its closed end to the pivotal connection of one of said two members,
 d. a piston in said chamber with a stem extending through the mentioned opening and directly connected to the pivotal connection of the other of said two members,
 e. hydraulic fluid filling the chamber on both sides of the piston,
 f. and shock absorbing means in the cylinder acting in both endwise directions of movement of said piston, said shock absorbing means comprising at least two poppet valves carried by the piston, one poppet valve being arranged to open for bypass flow of fluid from one end of said chamber to the opposite end when the cylinder and piston are moved relatively toward each other, and the other poppet valve being arranged to open for bypass flow of fluid from said opposite end of the chamber to said one end when the cylinder and piston are moved relatively away from each other, g. each said poppet valve having a passage extending through the piston from one end of said passage to the other end of said passage, said passage having a first cylindrical portion adjacent said one end of relatively larger diameter and a second cylindrical portion adjacent said other end of relatively small diameter, h. a poppet body in said passage having a guiding end slidably mounted in said first cylindrical portion and a restricting end slidably mounted in said second cylindrical portion to flow during movement of said restricting end between opposite ends of said second cylindrical portion, i. bypass means extending between said restricting end and the opposite end of said poppet body, and j. a resilient bias acting between said poppet body and said piston body to hold said poppet body in normal flow restricting position and yielding to pressure of hydraulic fluid being displaced by relative movement of the cylinder and piston to move said poppet body to open position whereby to extablish flow through the bypass means whereby to inhibit operation of the shock absorbing means for shock of magnitude insufficient to move said restricting end out of engagement with said second cylindrical portion.

2. A movement-limiting device according to claim 1 wherein there is an annular recess separating said restricting end from said guiding end.

3. A movement-limiting device according to claim 1 in which the restricting end of each poppet is provided with an annular sliding seal that has a sealing engagement with said second cylindrical portion, the sealing effect of said sliding seal being removed upon endwise displacement of the poppet body to a location clear of said second cylindrical portion.

4. A movement-limiting device as in claim 1 wherein the longitudinal axis of the cylinder is tilted from the vertical at an angle of about 30°.

5. A movement-limiting device as in claim 1 wherein there is a pivotal connection between one end of said movement-limiting device and the cab and between the other end of said movement-limiting device and the camper, the axes of said pivotal connections being substantially perpendicular to the fore and aft axis of said vehicle.

* * * * *